US007390405B2

(12) United States Patent
Liu

(10) Patent No.: US 7,390,405 B2
(45) Date of Patent: Jun. 24, 2008

(54) MAGNETIC DEVICE ADAPTED FOR VARIOUS ENGINE OIL FILTERING APPARATUSES

(76) Inventor: Chun-Hui Liu, 3F, No. 879, Chung Cheng Rd., Hsinchuang City, Taipei Hsien (TW)

( * ) Notice: Subject to any disclaimer, the term of this patent is extended or adjusted under 35 U.S.C. 154(b) by 429 days.

(21) Appl. No.: 11/139,474

(22) Filed: May 31, 2005

(65) Prior Publication Data

US 2006/0266688 A1 Nov. 30, 2006

(51) Int. Cl.
*B01D 35/06* (2006.01)

(52) U.S. Cl. ........................ 210/223; 210/222; 184/6.25

(58) Field of Classification Search ................. 210/222, 210/223; 184/6.25
See application file for complete search history.

(56) References Cited

U.S. PATENT DOCUMENTS 5,932,108 A * 8/1999 Brunsting ................... 210/223
7,192,520 B1 * 3/2007 Fowler et al. ............... 210/223

* cited by examiner

*Primary Examiner*—David A Reifsnyder
(74) *Attorney, Agent, or Firm*—Rosenberg, Klein & Lee

(57) ABSTRACT

A magnetic device adapted for various engine oil filtering apparatuses is proposed in the present invention. It includes an elastic metal plate; multiple holding bases, each of which has at least a containing portion, the holding bases being disposed on the elastic metal plate; and multiple magnets disposed in the containing portions of the holding bases respectively. The magnetic device has a sectional design and has various flexible combinations. Hence, it is more applicable and reduces the costs of production.

6 Claims, 6 Drawing Sheets

MAGNETIC DEVICE ADAPTED FOR VARIOUS ENGINE OIL FILTERING APPARATUSES

BACKGROUND OF THE INVENTION

1. Field of the Invention

The present invention is related to a magnetic device adapted for various engine oil filtering apparatuses, and more particularly, to a magnetic device suitable for installation onto various engine oil filtering apparatuses to filter out the iron powder or other impurities in the engine oil. The magnetic device has a sectional design and has various flexible combinations. Hence, it is more applicable than the prior art.

2. Description of Related Art

Reference is made to FIG. 1, which is a conventional magnetic device suited to be installed onto an engine oil filtering apparatus. The magnetic device 5 has a base 51 with an arc shape. The base 51 has multiple powerful magnets 52, which are closely arranged and fixed at the inner side of the base 51.

Reference is made to FIG. 2. The magnetic device 5 can be installed on an engine oil filtering apparatus 6. The magnetic device 5 is fixed on the housing 61 of the engine oil filtering apparatus 6. Thus, a magnetic field is formed inside the engine oil filtering apparatus 6. The powerful magnets 52 of the magnetic device 5 attract the iron powder or impurities via the housing 6. Hence, the engine oil is well filtered.

However, the conventional magnetic device mentioned above has a fixed shape and size. When in practical use, the engine oil filtering apparatuses may have different shapes and sizes and thus the conventional magnetic device is usually not suitable for installation on these apparatuses. Hence, the conventional magnetic device is inconvenient for installation and not applicable for different engine oil filtering apparatuses. In the prior art, for different engine oil filtering apparatuses, a wide variety of molds are usually made to produce the magnetic devices with different shapes and sizes. This greatly increases the costs of production.

Furthermore, the base of the conventional magnetic device should have more powerful magnets installed thereon. That also increases the costs of production. Moreover, the powerful magnets cannot be flexibly arranged in different manners to suit practical requirements.

Accordingly, as discussed above, the prior art still has some drawbacks that could be improved upon. The present invention aims to resolve the drawbacks of the prior art.

SUMMARY OF THE INVENTION

An objective of the present invention is to provide a magnetic device adapted for various engine oil filtering apparatuses. The magnetic device has a sectional design and has various flexible combinations. Hence, the installation of the present invention is convenient and the magnetic device is more adaptive for the engine oil filtering apparatuses with different standards and shapes. Hence, the present invention removes the need to make a variety of molds thus reduces the costs of production.

Another objective of the present invention is to provide a magnetic device adapted for various engine oil filtering apparatuses. The magnetic device has a sectional design. Thus, the combination of its magnets is flexible so as to fulfill the practical requirements to further reduce the costs of production.

For reaching the objectives above, the present invention provides a magnetic device adapted for various engine oil filtering apparatuses. It includes an elastic metal plate; multiple holding bases, each of which has at least a containing portion, the holding bases being disposed on the elastic metal plate; and multiple magnets disposed in the containing portions of the holding bases respectively.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
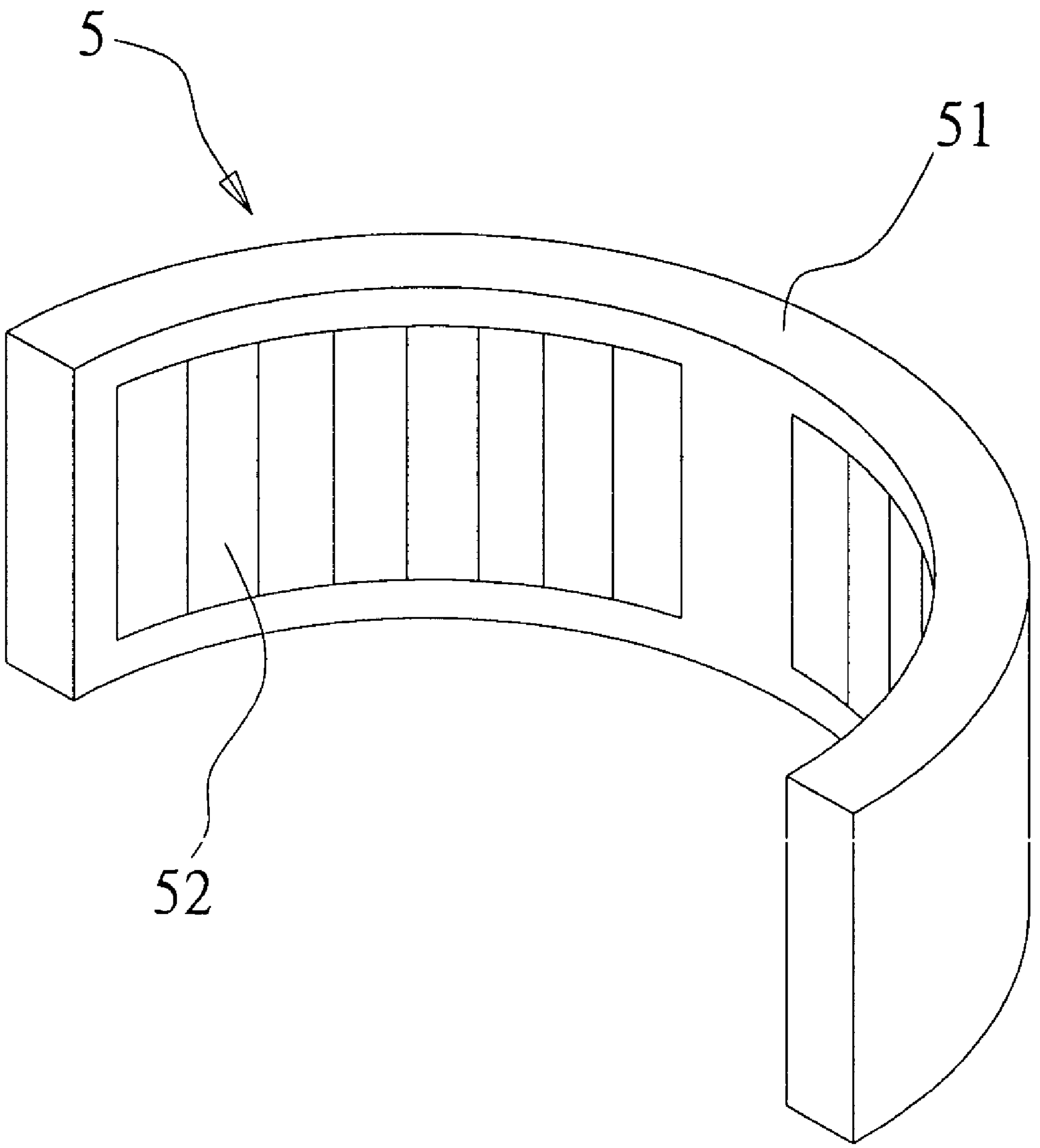
FIG. 1 PRIOR ART
FIG. 1 is a schematic diagram of a conventional magnetic device.
Figure 2:
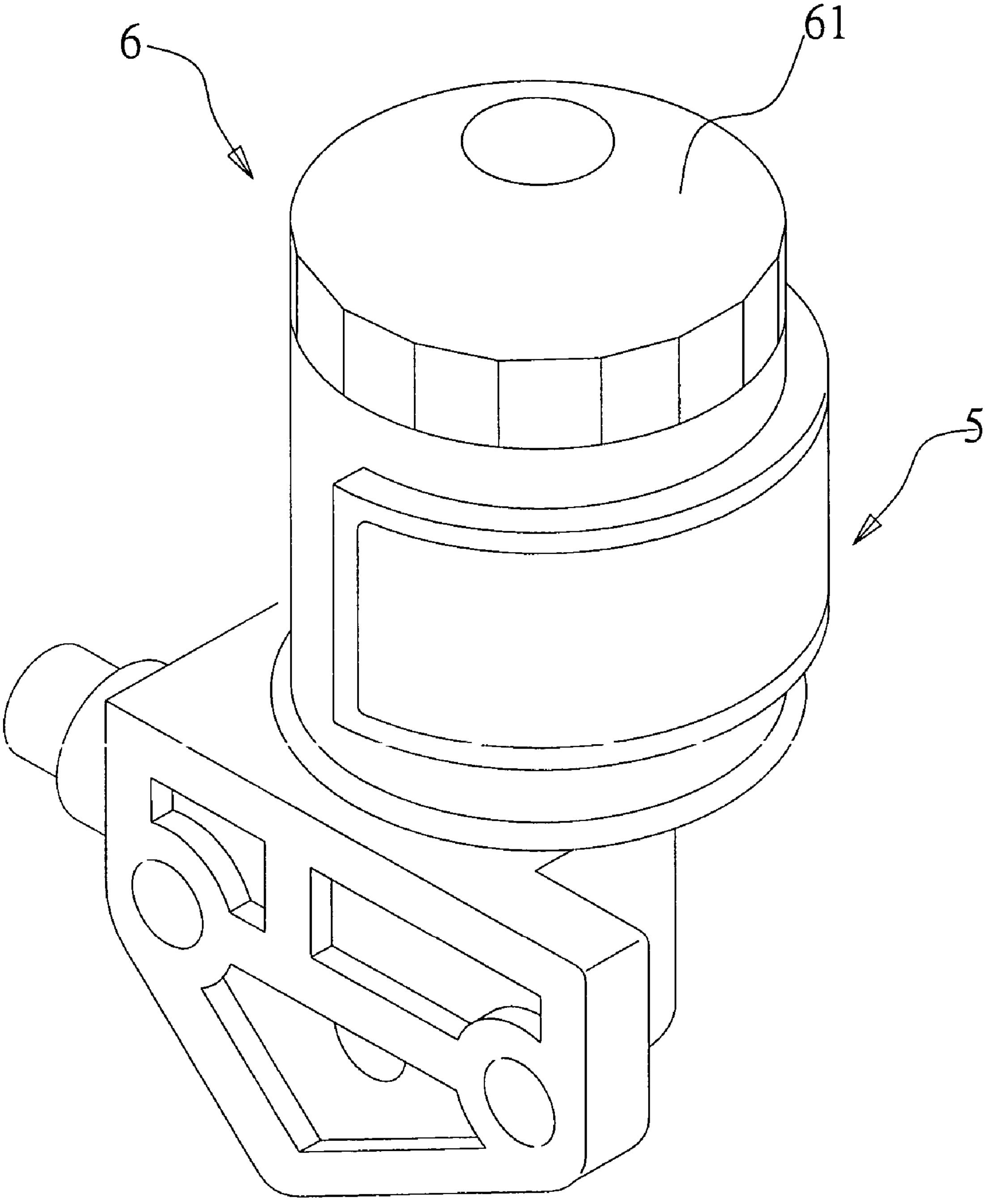
FIG. 2 PRIOR ART
FIG. 2 is a schematic diagram showing the conventional magnetic device attached to an engine oil filtering apparatus.
Figure 3:
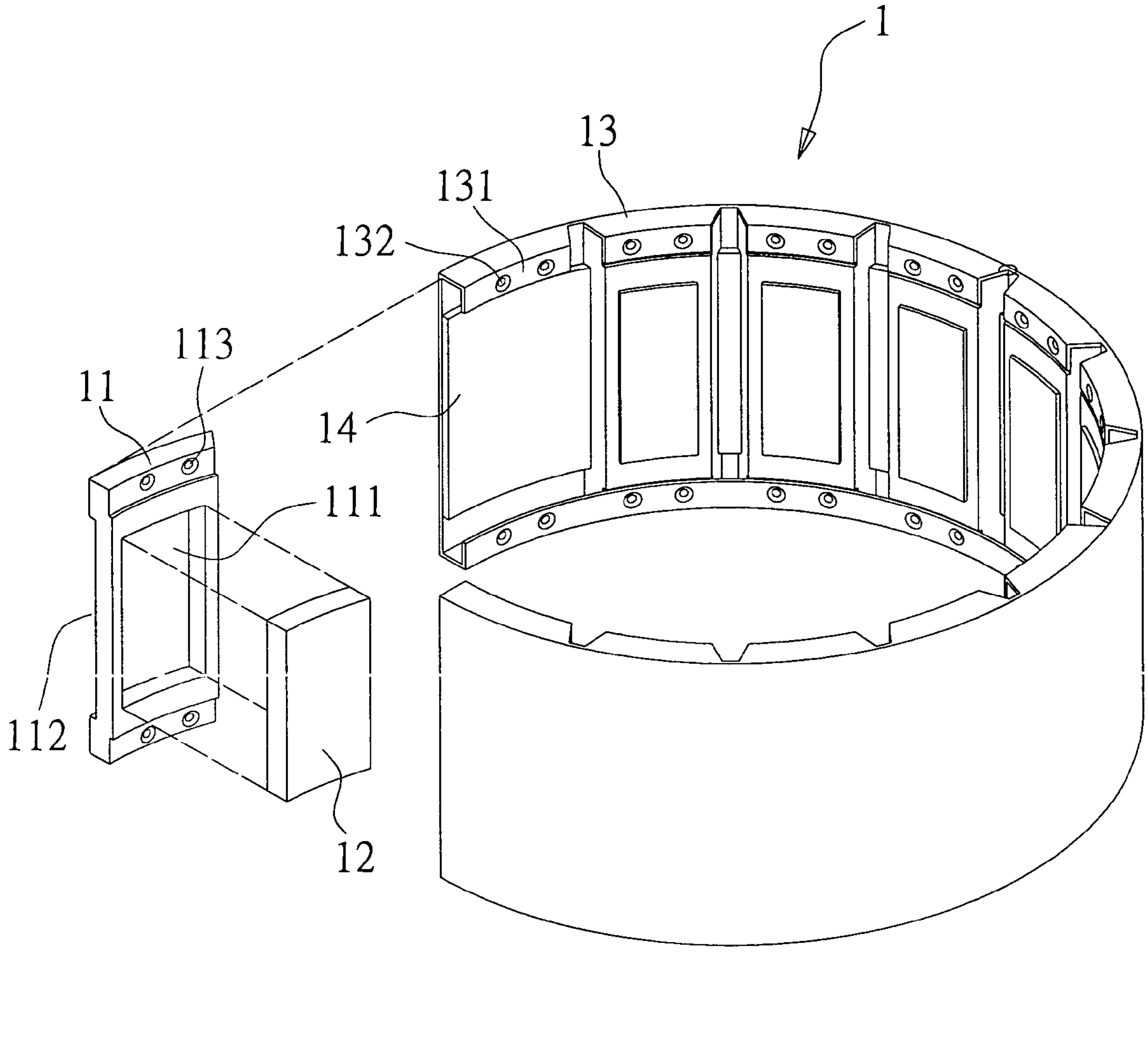
FIG. 3 is a decomposed view of a magnetic device in accordance with the present invention.
Figure 4:
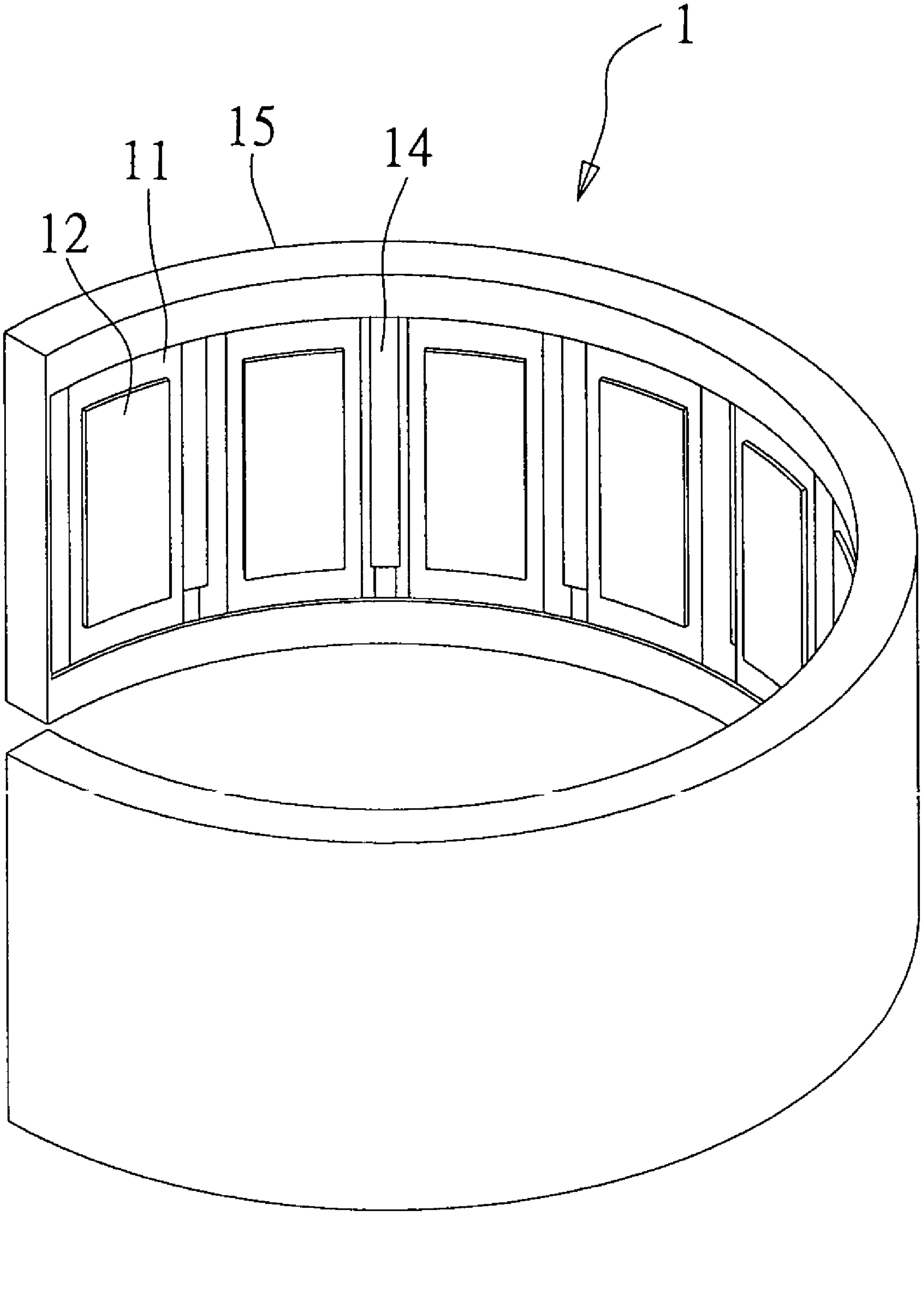
FIG. 4 is a combinative view of the magnetic device in accordance with the present invention.
Figure 5:
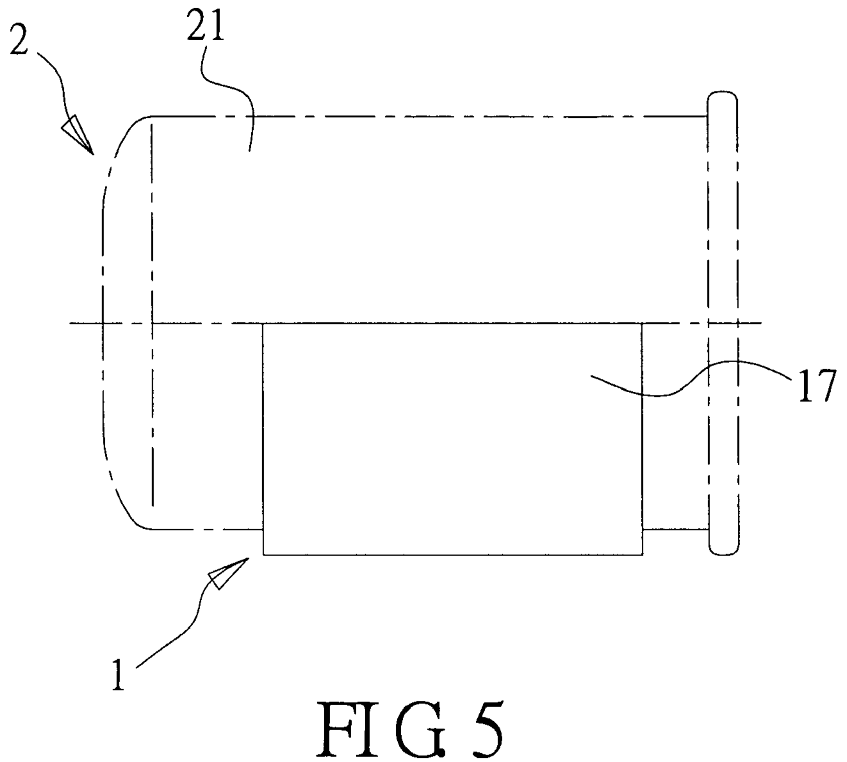
FIG. 5 shows a first attachment example of the magnetic device in accordance with the present invention.
Figure 6:
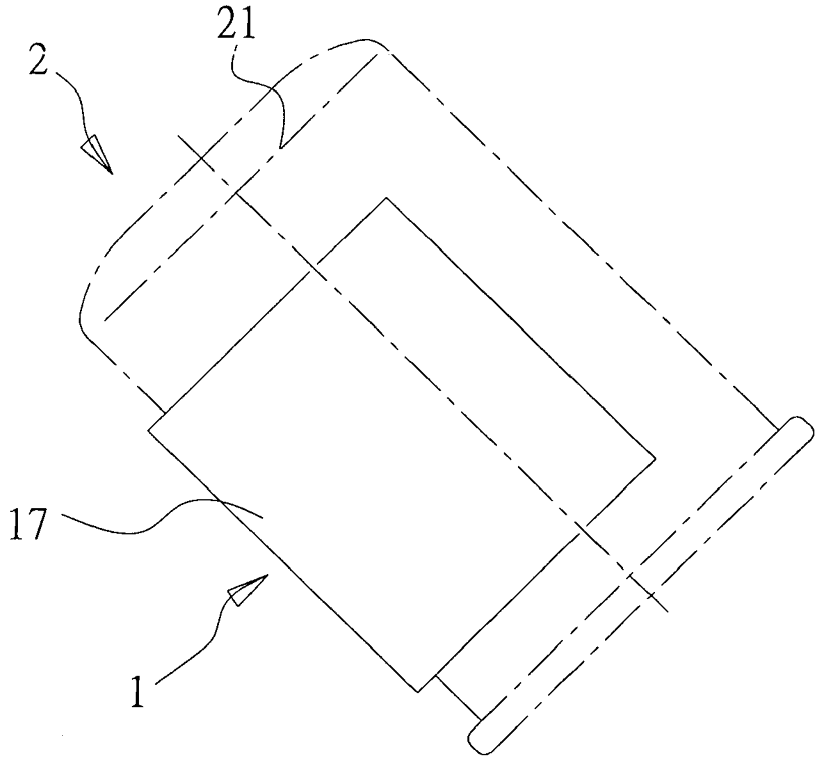
FIG. 6 shows a second attachment example of the magnetic device in accordance with the present invention.
Figure 7:
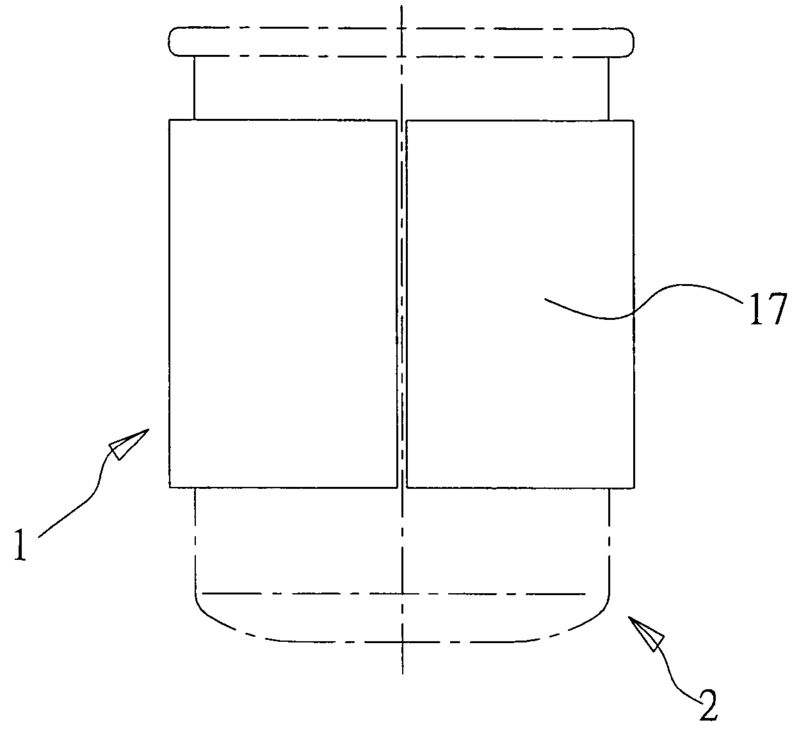
FIG. 7 shows a third attachment example of the magnetic device in accordance with the present invention.
Figure 8:
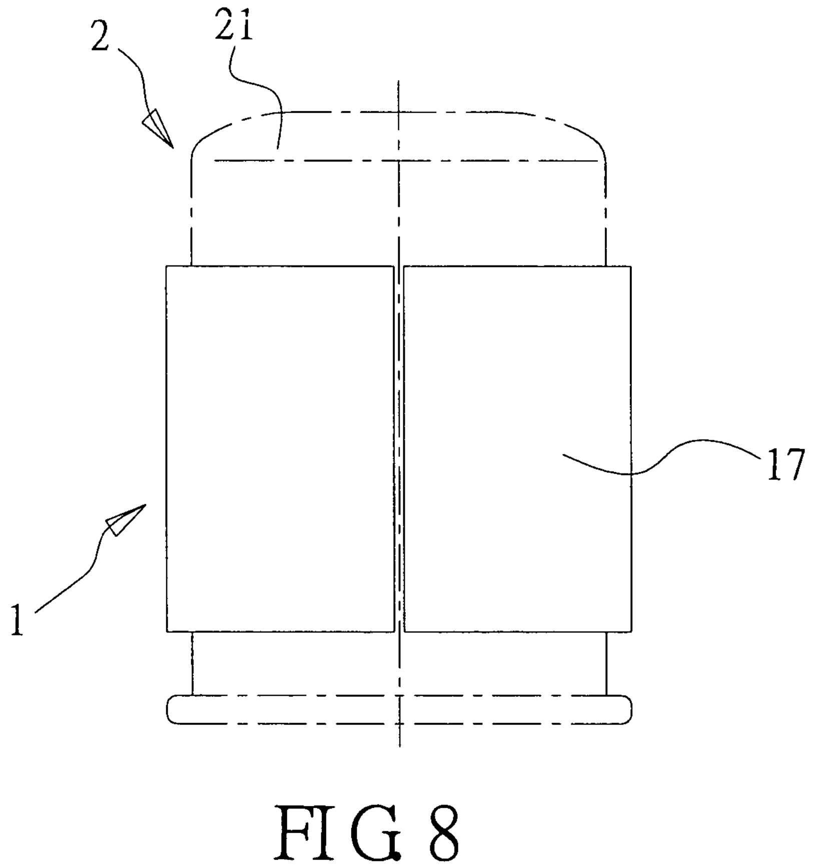
FIG. 8 shows a fourth attachment example of the magnetic device in accordance with the present invention.

Reference is made to FIGS. 3-4. The present invention provides a magnetic device adapted for various engine oil filtering apparatuses. The magnetic device 1 includes multiple holding bases 11, multiple magnets 12 and an elastic metal plate 13. The holding bases 11 are made of a magnetically permeable or non-permeable metal material or a plastic material and have a flat rectangular shape. The shape of the holding bases 11 has a proper radian. Each of the holding bases 11 has a containing portion 111 passing through two opposite sides thereof. The size and shape of the containing portion 111 is not limited. The containing portion 111 can have a rectangular or circular shape or other proper shapes. In this embodiment, the containing portion 111 is rectangular. The number of the holding bases 11 is not limited and can be changed according to the standard, shape or practical requirements of the engine oil filtering apparatus used.

The magnets 12 are respectively disposed within the containing portions 111 and fixed by using viscose or the like. The magnets 12 can be powerful magnets or common magnets. The number, size and shape of the magnets 12 are not limited. The magnets 12 can have a rectangular or circular shape or other proper shapes. In this embodiment, the magnets 12 are rectangular. If the magnetic force doesn't need to be very large, some of the magnets 12 disposed in the containing portions 111 of the holding bases 11 can be replaced by plastic blocks having the same shape.

Each of the outer sides of the magnets 12 has an isolating plate 14 fixed thereon. The isolating plates 14 are made of a stainless steel material. The isolating plates 14 are disposed in the corresponding concave portions 112 and have a magnetism-isolated property used to reduce the outward magnetic attraction. In this way, the backside of the magnetic device has no magnetism. Thus, the magnetic device doesn't attract surrounding pollutant material, has no side effects and doesn't affect nearby electronic equipment. The elastic metal plate 13 is made of a metal material with good elasticity.

The upper and lower edges of the elastic metal plate 13 are bent to form multiple fixing portions 131 corresponding to the holding bases 11. An upper fixing portion 131 and a lower fixing portion 131 hold each of the holding bases 11. The holding bases 11 and the fixing portions 131 have corresponding concave points 113 and projective points 132 respectively. The concave points 113 and projective points 132 are combined together to fasten the holding bases 11 in the fixing portions 131 of the elastic metal plate 13. Thus, the holding bases 11 are periodically disposed on the elastic metal plate 13.

Since the elastic metal plate 13 is flexible, the elastic metal plate 13 has a flexible connection to the holding bases 11. This makes the holding bases 11 attach closely onto the housing of the engine oil filtering apparatus. Furthermore, the elastic metal plate 13 and the holding bases 11 are covered with a soft protective cover 15 made of a plastic material. In this way, the magnetic device of the present invention is adapted for the engine oil filtering apparatus completely.

Reference is made to FIGS. 5-8. The magnetic device of the present invention has a sectional design. The number of the holding bases 11 can be changed according to the standard and shape of the engine oil filtering apparatus 2, its way of disposition and other practical requirements. The combinations of the magnetic device 1 may have different lengths. The magnetic device 1 can occupy one-half (shown as FIG. 5), two-thirds (shown as FIG. 6) or the entire (shown as FIGS. 6-7) peripheral surface of the engine oil filtering apparatus 2.

When the magnetic device 1 is disposed on the engine oil filtering apparatus 2, a magnetic field is formed inside the engine oil filtering apparatus 2. Then, the magnets 12 of the magnetic device 1 attract iron powder and other impurities via the housing 21. Thus, the filtering effect is achieved.

The present invention can be arbitrarily attached to the housing of any kind of engine oil filtering apparatuses in a surrounding manner to form a large circular magnetic field. Thus, the micrometer iron powder inside engine oil can be filtered out to activate the molecules of the engine oil and increase the lubricity of the engine oil inside the running engine.

The present reduces the friction induced by iron powder, heat generation and abrasion and thus reduces repair costs and noise generation in the running engine. The installation of the present invention is speedy and convenient. Furthermore, the present invention has an immediate effect and can be used repeatedly. Using the present invention constantly increases the life of the engine, makes engine oil last longer and improves the performance of the engine. The horsepower of the engine is thus increased and less fuel is used.

The magnetic device 1 has a sectional design. Its size or combinations can be changed flexibly. Thus, for an engine oil filtering apparatuses of a different standard or shape, corresponding combinations of the magnetic device 1 can be provided easily. The holding bases 11 are combined by using the elastic metal plate 13 and can thus be suitably and closely attached to the housings of an engine oil filtering apparatuses of a different standard or shape. Hence, the installation of the magnetic device 1 is convenient. Moreover, the magnetic device 1 is more adaptive for engine oil filtering apparatuses with different standards and shapes. Hence, the present invention removes the need of producing a variety of molds and thus reduces the costs of production.

Furthermore, since the magnetic device 1 has a sectional design, the combination of the magnets 12 is also flexible to fulfill practical requirements. If the magnetic force doesn't need to be very large, plastic blocks can replace some of the magnets 12 or common magnets can be used in the present invention. Thus, costs can be further reduced.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are embraced within the scope of the invention as defined in the appended claims.

What is claimed is:

1. A magnetic device adapted for different engine oil filtering apparatuses, comprising:
- an elastic metal plate;
- a plurality of holding bases, retained on an inner side of the elastic metal plate, each of said holding bases having a receiving space, each of said holding bases being releasable mounted to said elastic metal plate; and
- a plurality of magnets received in fixed containment in the receiving spaces of the holding bases respectively.

2. The magnetic device as claimed in claim 1, wherein the holding bases have an arc shape.

3. The magnetic device as claimed in claim 1, wherein each of the receiving spaces passes through two opposite sides of a corresponding one of the holding bases, each of the magnets has an outer side having an isolating plate attached fixedly thereto.

4. The magnetic device as claimed in claim 1, wherein the elastic metal plate has an upper edge and a lower edge bent to form a plurality of fixing portions corresponding to the holding bases, each of the holding bases is fastened via an upper fixing portion and a lower fixing portion.

5. The magnetic device as claimed in claim 4, wherein the holding bases and the fixing portions have corresponding concave points and projective points respectively, and the concave points and the projective points are combined together.

6. The magnetic device as claimed in claim 4, wherein the elastic metal plate and the holding bases are covered with a soft protective cover.

* * * * *